United States Patent
Lorenz et al.

(10) Patent No.: US 6,817,624 B2
(45) Date of Patent: *Nov. 16, 2004

(54) GAS BAG MODULE

(75) Inventors: Christian Lorenz, Leidersbach (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,501

(22) Filed: Mar. 1, 2002

(65) Prior Publication Data
US 2002/0121769 A1 Sep. 5, 2002

(30) Foreign Application Priority Data
Mar. 1, 2001 (DE) ..................... 201 03 581 U

(51) Int. Cl.⁷ ..................... B60R 21/16; B60R 21/28
(52) U.S. Cl. ............... 280/728.2; 280/731; 280/739; 280/740
(58) Field of Search ............ 280/728.2, 728.3, 280/731, 739, 740, 743.1

(56) References Cited

U.S. PATENT DOCUMENTS

| | | | |
|---|---|---|---|
| 4,828,286 A | * | 5/1989 | Fohl ..................... 280/731 |
| 6,042,147 A | * | 3/2000 | Nishijima et al. ....... 280/743.1 |
| 6,183,003 B1 | * | 2/2001 | Matsuhashi et al. .... 280/728.2 |
| 6,247,724 B1 | * | 6/2001 | Jambor et al. ............ 280/731 |
| 6,254,121 B1 | * | 7/2001 | Fowler et al. ............ 280/729 |
| 6,443,484 B2 | * | 9/2002 | Anglsperger ........... 280/728.3 |
| 6,550,804 B2 | * | 4/2003 | Burdock .................. 280/731 |
| 2001/0052690 A1 | * | 12/2001 | Nishiura et al. ........ 280/728.3 |
| 2002/0135163 A1 | * | 9/2002 | Derrick .................. 280/731 |

FOREIGN PATENT DOCUMENTS

| | | |
|---|---|---|
| DE | 19633883 A1 | 2/1998 |
| DE | 197 49 914 A1 | 5/1999 |
| DE | 198 16 080 A1 | 10/1999 |
| DE | 20012864 U1 | 1/2001 |

OTHER PUBLICATIONS

Co-pending U.S. patent application Ser. No. 09/882,155, filed Jun. 15, 2001 entitled "Passenger Gas Bag Protection Device".

* cited by examiner

Primary Examiner—Paul N. Dickson
Assistant Examiner—Laura B. Rosenberg
(74) Attorney, Agent, or Firm—Tarolli, Sundheim, Covell & Tummino L.L.P.

(57) ABSTRACT

The invention relates to a gas bag module comprising a gas bag which has a gas bag wall with a front wall section. The module further comprises a cover which has a given annular section which closes an annular outlet opening for the gas bag and has a stationary central portion which is surrounded by the annular section. A section of the gas bag wall other than the front section has an outflow opening which in a folded state of the gas bag is arranged beneath the central portion in such a manner that on outlet of the gas bag, the central portion arrives via the outflow opening into an interior of the gas bag.

10 Claims, 2 Drawing Sheets

GAS BAG MODULE

TECHNICAL FIELD

The invention relates to a gas bag module.

BACKGROUND OF THE INVENTION

Known gas bag modules comprise a gas bag which has a gas bag wall with a front wall section, and a cover which has a given annular section closing an annular outlet opening for the gas bag and has a stationary central portion which is surrounded by the annular section. Such gas bags differ from others used hitherto by the annular outlet opening. The central portion remains stationary on opening of the covering, i.e. it is not swung outwards. An advantage connected with this design consists in that a large flap which swings outwards is no longer formed on the covering. The annular section usually consists of small segments adjoining each other peripherally, which serve as flaps but which take up a very small amount of space and also scarcely project into the passenger interior after opening. The gas bag modules with stationary central portion are hitherto to have had an annular gas bag, by the front wall section of the gas bag, which faces the occupant, being prevented from emerging from the module in the region of its center. The resultant centric indentation is kept small or closed by the most varied of measures.

BRIEF SUMMARY OF THE INVENTION

The invention provides a gas bag module in which an indentation is no longer present in the region of the front wall section. This is achieved in a gas bag module which comprises a gas bag which has a gas bag wall with a front wall section. The module further comprises a cap-shaped cover which has a given annular section which closes an annular outlet opening for the gas bag and has a stationary central portion which is surrounded by the annular section. The gas bag wall has an outflow opening which in a folded state is arranged beneath the central portion in such a manner that on outlet of the gas bag, the central portion arrives via the outflow opening into an interior of the gas bag. The outflow opening is situated in sections of the gas bag other than the front wall section, i.e. in a side or rear wall section. The gas bag is therefore folded such that the edge of the outflow opening slides past the central portion on unfolding, therefore, the latter moves relative to the gas bag wall into the interior of the gas bag. Through the fact that, however, the outflow opening is situated outside the front wall section, i.e. the section onto which the occupant strikes, the front wall section is closed, without it featuring an opening or indentation. The outflow opening itself can then serve to vent the gas bag or to give it a different hardness on impact of the occupant. The outflow opening consequently has a dual function.

Preferably, in the inflated gas bag the outflow opening is to lie on its rear wall section, i.e. facing away from the occupant.

According to the preferred embodiment, the gas bag module is a steering wheel module, because in steering wheels the distance of the head of the occupant from the covering is usually less than in a passenger module, so that the advantage of the annular outlet opening comes into use particularly here.

The central portion is preferably permanently arrested on the module by means of a fastening piece, in particular a rigid fastening piece. The fastening piece projects in the folded state of the gas bag through the outflow opening and can therefore form a guide for the edge of the outflow opening on emergence from the module.

According to an embodiment, the central portion comprises or is an emblem constructed as a separate part. The emblem can be provided externally on a stationary section of a plastic cover part. The emblem, hitherto, had to be fastened with a great deal of effort to the flaps, which have a large area and swing outwards. In the gas bag module according to the invention, the emblem is at least part of the central portion and remains at its original place, despite the gas bag moving in outward direction.

The emblem can either be fastened to the stationary section or to a fastening piece, in the latter case preferably the fastening of the emblem also serving for that of the stationary section to the fastening piece, in order to save parts.

The cover can also be formed from various individual parts, which are not connected with each other in one piece, for example the annular section and the central portion. The central portion can also, for example, only be formed by the emblem. This embodiment has the advantage that on opening of the cover, smaller forces are necessary, because the central portion and the annular section are, originally, separate parts. According to a further embodiment, a stationary section defining one piece with the annular section per se or together with the emblem, arranged on its outer side, defines the central portion.

DETAILED DESCRIPTION OF THE PREFERRED EMBODIMENTS

Figures 1, 2:
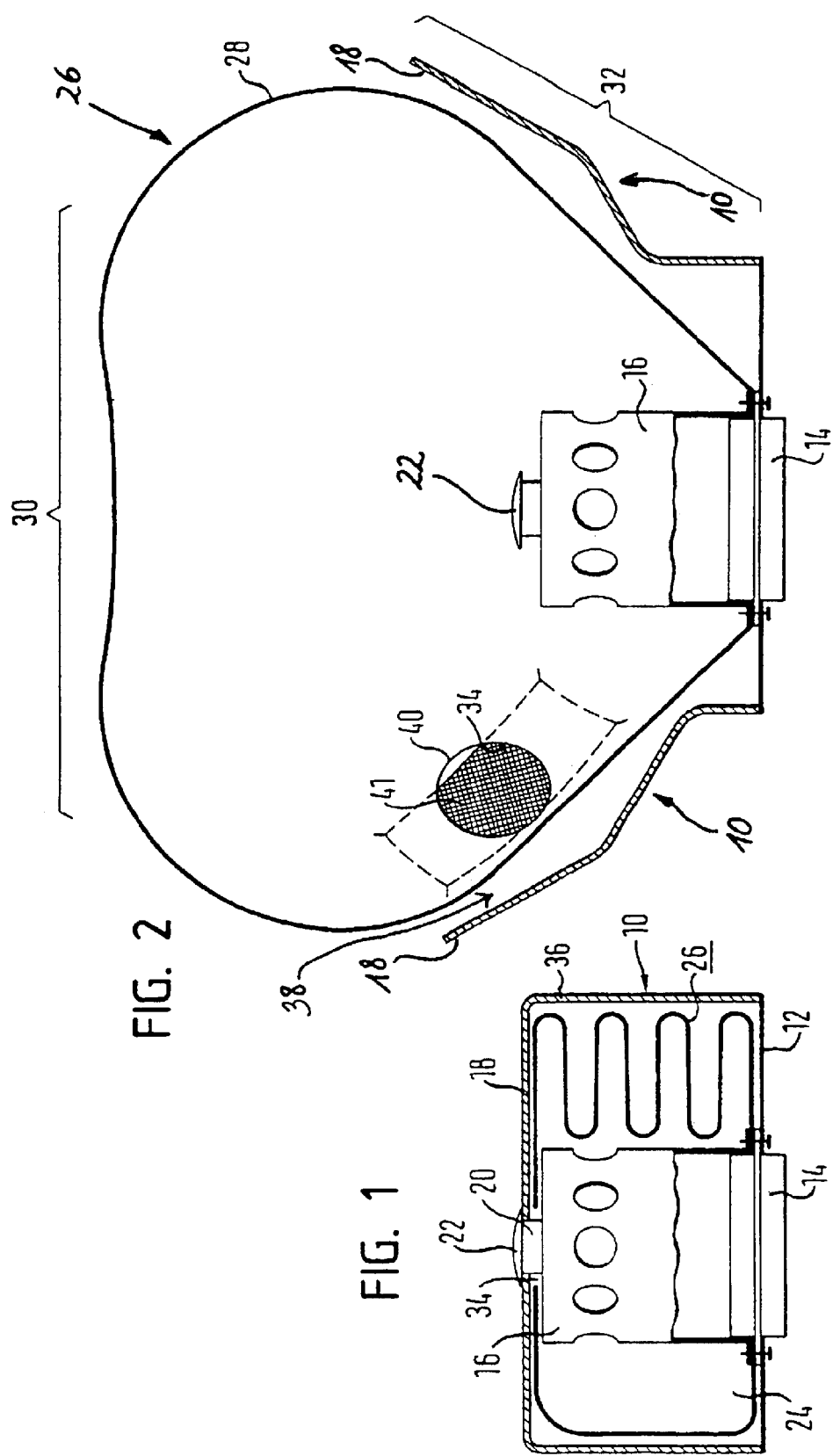
FIG. 1 shows a cross-sectional view through an embodiment of the gas bag module according to the invention.
FIG. 2 shows the gas bag module according to FIG. 1 with the gas bag inflated.

In FIG. 1 a steering wheel gas bag module is shown, which has the form of a closed container in the non-activated state, which is formed by a cup-shaped cover or cover cap and a rear wall 12. A gas generator 14 projects into the interior of the module and is surrounded by a cup-shaped diffusor 16, which projects from the rear wall 12 to the opposite wall of the cover 10. The opposite wall has a central opening, so that it forms an annular section 18 of the cover 10. Through the central opening, a tubular fastening piece 20 extends which is arrested on the end wall of the diffusor 16. Fastened to the outer end of this fastening piece 20 is an emblem 22 of plastic and sheet metal. As the emblem 22 closes the opening in the annular section, it forms a part of the cover 10, the annular section 18 and the emblem 22 being formed by separate parts. The emblem 22 is also designated as central portion of the cover 10. The edge which forms the central opening in the annular section 18, projects under the emblem 22 so that the annular section 18, with the module closed, can not be opened from the exterior.

Inside the module, between the cover 10 and the diffusor 16, an annular space 24 is defined, in which a folded gas bag 26 is housed. The gas bag is not housed symmetrically in the annular space 24, rather a part of the annular space (the left-hand part in FIG. 1) is less filled with the folded gas bag 26 than another part (the right-hand part of the annular space 24 in FIG. 1).

The gas bag, in relation to FIG. 2, consists of a gas bag wall 28 which has various sections. A front wall section 30 faces the occupant who is to be restrained, and the occupant strikes onto it in the case of restraint. In addition, a rear wall section 32 is provided, which faces away from the occupant. The rear wall section 32 has an outflow opening 34 for gas. In the folded state, the outflow opening 34 lies beneath the central portion (emblem 22). Through the position of the outflow opening 34 on the rear wall section 32, the asymmetrical accommodating of the gas bag in the annular space 24 comes about. The fastening piece 20 projects, in the folded state, through the outflow opening 34.

On activation of the gas generator 14, gas flows into the interior of the diffusor 16 and then out from the diffusor 16 into the gas bag. The gas bag presses onto the annular section 18 and, in addition, partially also onto the side wall 36 of the cover 10, so that the annular section 18 and the side wall 36 are pressed outwards and, as shown in FIG. 2, swing outwards. Thereby, an annular outflow opening 38 is exposed for the gas bag. The edge 40 of the outflow opening slides along the fastening piece 20 and the emblem 22, so that the emblem 22 is finally situated inside the gas bag 26.

The outflow opening 34 permits a blowing out of gas, in particular when the occupant strikes onto the gas bag 26, whereby pressure peaks are reduced.

In addition, a closure element can be provided in the form of a fabric band 41 and can be fastened by its short sides to the gas bag wall 28 in such a manner that in the folded state of the gas bag it extends past the fastening piece 20. On unfolding, however, the fabric band 41 moves in front of the outflow opening 34, in order to partially or completely close it. Despite large emblems 22 and large outflow openings 34, thereby small effective outflow cross-sections can be realized. The closure element can be fastened to the gas bag wall 28 from the outside or the inside.

Figure 3:
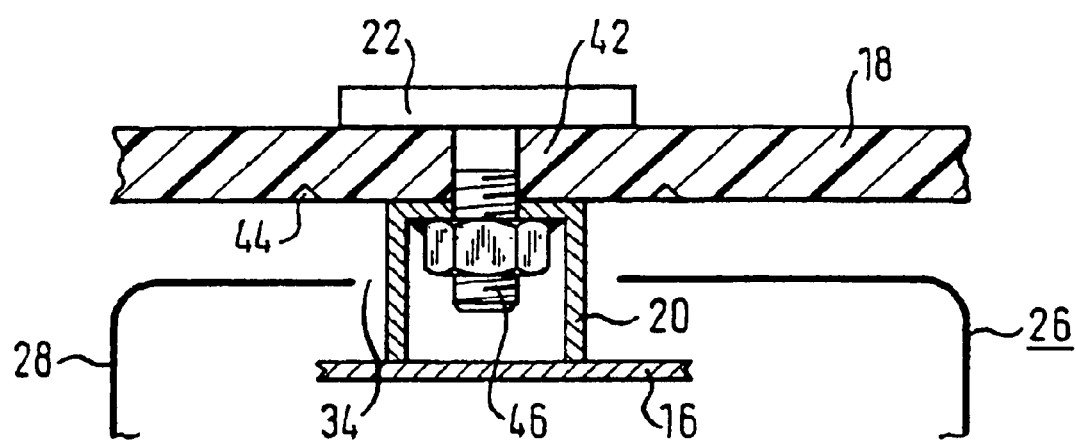
FIG. 3 shows an enlarged view of another embodiment in the region of the annular section and of the central portion.

In the embodiment according to FIG. 3, a stationary section 42 adjoins, in one piece, the annular section 18, which stationary section 42 lies beneath the emblem 22 and is separated from the annular section 18 by means of a given, annular tear-open line 44. Emblem 22 and stationary section 42 define the central portion. Stationary rection 42 and annular section 18 define a plastic cover part. The stationary section 42 is gripped and clamped between the emblem 22, which on the rear has formed on one or more screw bolts 46, and the fastening piece 20. Therefore, the fastening of the emblem 22 via the screw bolts 46 also serves for the fastening of the stationary section 42 on the fastening piece 20. Alternatively, in embodiments without a separate emblem 22, it would be possible to embed a bolt into the stationary section 42 by casting or injection-molding, which bolt then projects on the rear face for fastening the stationary section 42 to the module. In the latter embodiment, the central portion only comprises the stationary section.

Instead of the fastening piece 20, the stationary section 42 or the module can also be fastened directly to the gas generator 14 or to the rear wall 12.

On unfolding of the gas bag 26, the plastic cover part tears open along tear line 44. Annular section 18 further tears sidewardly and pivots outwardly. Stationary section 42 remains clamped between fastening piece 20 and emblem 22 and is prevented from movement outwardly.

What is claimed is:

1. A gas bag module comprising:

a gas bag which has a gas bag wall with a front wall section, and a cover including a stationary central portion and an annular section surrounding the stationary central portion, said annular section closing an annular opening for said gas bag, and a section of said gas bag wall other than the front wall section having a gas outflow opening which in a folded state of said gas bag is arranged beneath said central portion in such a manner that upon inflation of said gas bag, said central portion and said gas outflow opening move relatively to each other and, in a fully inflated state of said gas bag, said central portion lies completely within an interior of said gas bag.

2. The gas bag module according to claim 1, wherein said gas outflow opening is provided in a rear wall section of said gas bag wall.

3. The gas bag module according to claim 1, wherein said module is a steering wheel module.

4. The gas bag module according to claim 1, wherein said central portion of said cover is arrested permanently on said module by means of a fastening piece and said fastening piece, in said folded state of said gas bag, projects through said outflow opening.

5. The gas bag module according to claim 4, wherein said annular section and said central portion of said cover are one piece and an emblem, defined as a separate piece, overlies and engages said central portion of said cover, said annular section and said central portion of said cover being separated by an annular tear line upon inflation of said gas bag.

6. The gas bag module according to claim 5, wherein said emblem is arrested on said fastening piece and a fastening of said emblem also serves for fastening of said stationary section on said fastening piece.

7. The gas bag module according to claim 1, wherein said central portion is defined by an emblem constructed as a separate piece from said annular section of said cover.

8. The gas bag module according to claim 7, wherein said emblem is arrested on a fastening piece.

9. The gas bag module according to claim 1, wherein said central portion and said annular section define separate parts of said cover.

10. The gas bag module according to claim 1, wherein a fabric closure element is provided which is arranged on said gas bag wall and upon inflation of said gas bag said closure element at least partially overlying said gas outflow opening to at least partially close said gas outflow opening.

* * * * *